United States Patent
Kim et al.

(10) Patent No.: US 11,019,190 B2
(45) Date of Patent: May 25, 2021

(54) ELECTRONIC DEVICE INCLUDING CONNECTING MEMBER SHARING STRUCTURE

(71) Applicant: Samsung Electronics Co., Ltd., Gyeonggi-do (KR)

(72) Inventors: Yonghwa Kim, Gyeonggi-do (KR); Bumhee Bae, Gyeonggi-do (KR); Dongil Son, Gyeonggi-do (KR); Hyunwoo Sim, Gyeonggi-do (KR); Jaedeok Lim, Gyeonggi-do (KR); Seungbum Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/515,712

(22) Filed: Jul. 18, 2019

(65) Prior Publication Data

US 2020/0028949 A1    Jan. 23, 2020

(30) Foreign Application Priority Data

Jul. 18, 2018 (KR) .................. 10-2018-0083378

(51) Int. Cl.
*H04M 1/02* (2006.01)
*H04B 1/38* (2015.01)
(Continued)

(52) U.S. Cl.
CPC .......... *H04M 1/0277* (2013.01); *H01Q 1/243* (2013.01); *H01Q 5/30* (2015.01); *H04M 1/0266* (2013.01)

(58) Field of Classification Search
CPC ...... H01B 1/38; H01B 1/3827; H01B 1/3833; H01B 1/40; H04M 1/0202; H04M 1/026;
(Continued)

(56) References Cited

U.S. PATENT DOCUMENTS 7,423,605 B2 * 9/2008 Qi .................. H01Q 1/243
   343/702
8,233,950 B2 * 7/2012 Hobson ............ H01Q 1/243
   455/575.5
(Continued)

FOREIGN PATENT DOCUMENTS

KR   1020120097980     9/2012
KR   1020130079019     7/2013
(Continued)

OTHER PUBLICATIONS

International Search Report dated Oct. 29, 2019 issued in counterpart application No. PCT/KR2019/008681, 10 pages.

*Primary Examiner* — Quochien B Vuong
(74) *Attorney, Agent, or Firm* — The Farrell Law Firm, P.C.

(57) ABSTRACT

An electronic device includes a housing including a first plate, a second plate facing away from the first plate, and a lateral member surrounding a space between the first and second plates; a display disposed in the housing and exposed through at least a part of the first plate; an antenna module disposed at a first area adjacent to the lateral member; an electronic component disposed at a second area adjacent to the first area in the housing; at least one wireless communication circuit disposed in the housing and configured to transmit or receive a signal having a frequency between 3 gigahertz (GHz) and 100 GHz through the antenna module; a processor disposed in the housing; and a flexible printed circuit board (FPCB) including a first conductive line electrically connected between the at least one wireless communication circuit and the antenna module, and a second conductive line electrically connected between the processor and the electronic component.

15 Claims, 12 Drawing Sheets

(51) Int. Cl.
*H01Q 5/30* (2015.01)
*H01Q 1/24* (2006.01)

(58) Field of Classification Search
CPC ............ H04M 1/0266; H04M 1/0274; H04M 1/0277; H04M 1/7253; H01W 88/02; H01Q 1/243; H01Q 21/00; H01Q 1/241; H01Q 1/27; H01Q 1/38; H01Q 5/30; H01Q 5/321; H01R 1/1041; H01R 1/1058
See application file for complete search history.

(56) References Cited

U.S. PATENT DOCUMENTS

| | | | |
|---|---|---|---|
| 9,596,330 B2* | 3/2017 | Caballero | H04M 1/0266 |
| 9,859,612 B2* | 1/2018 | Jung | H04W 4/80 |
| 10,024,885 B2* | 7/2018 | Shamir | G01R 21/14 |
| 10,727,568 B2* | 7/2020 | Cho | H01Q 21/28 |
| 2014/0225806 A1 | 8/2014 | Lee et al. | |
| 2017/0358847 A1 | 12/2017 | Cho et al. | |
| 2018/0096754 A1 | 4/2018 | Song et al. | |

FOREIGN PATENT DOCUMENTS

| | | |
|---|---|---|
| KR | 10-2016-0000621 | 1/2016 |
| KR | 10-2017-0119531 | 10/2017 |

\* cited by examiner

ELECTRONIC DEVICE INCLUDING CONNECTING MEMBER SHARING STRUCTURE

CROSS-REFERENCE TO RELATED APPLICATION(S)

This application is based on and claims priority under 35 U.S.C. 119 to Korean Patent Application No. 10-2018-0083378, filed on Jul. 18, 2018, in the Korean Intellectual Property Office, the disclosure of which is incorporated by reference herein in its entirety.

BACKGROUND

1. Field

The present disclosure relates generally to an electronic device including a structure that shares a connecting member such as a flexible printed circuit board (FPCB).

2. Description of Related Art

Electronic devices, especially portable devices such as smart phones, are becoming smaller, slimmer and multi-functional.

The electronic devices include various kinds of electronic components such as a processor, a memory, a speaker, a sensor, a camera, an antenna or a communication module, which are mounted on or connected to a circuit board such as a printed circuit board (PCB), a printed board assembly (PBA), or a flexible printed circuit board (FPCB). Such circuit boards may include conductive lines (or circuit wirings) that connect various electronic components to each other.

In electronic devices, various kinds of electronic components (e.g., a speaker, a sensor, a camera, and an antenna) and various cables are overlapped with each other. As such, the internal space of the electronic device may be insufficient.

For example, among such electronic components, the speaker may need a certain amount of space to be mounted. However, if the FPCB of the speaker and the conductive line of the antenna (or the communication module) are formed to overlap each other, the mounting space of the speaker may be insufficient. In addition, when the conductive line of the antenna (or the communication module) is used, a hole, a screw, and a guide structure for fixing the conductive line of the antenna may be separately required. In this case, the assembly and manufacturing process of the electronic device may become complicated.

SUMMARY

The present disclosure has been made to address the above-mentioned problems and disadvantages, and to provide at least the advantages described below.

In accordance with an aspect of the present disclosure, an electronic device includes a housing including a first plate, a second plate facing away from the first plate, and a lateral member surrounding a space between the first and second plates; a display disposed in the housing and exposed through at least a part of the first plate; an antenna module disposed at a first area adjacent to the lateral member; an electronic component disposed at a second area adjacent to the first area in the housing; at least one wireless communication circuit disposed in the housing and configured to transmit or receive a signal having a frequency between 3 gigahertz (GHz) and 100 GHz through the antenna module; a processor disposed in the housing; and an FPCB including a first conductive line electrically connected between the at least one wireless communication circuit and the antenna module, and a second conductive line electrically connected between the processor and the electronic component.

In accordance with another aspect of the present disclosure, an electronic device includes a housing including a first plate, a second plate spaced apart and facing away from the first plate, and a lateral member surrounding a space between the first and second plates and including at least one conductive portion; a display disposed in the housing and exposed through at least a part of the first plate; an electronic component disposed in the housing and disposed adjacent to the at least one conductive portion; a wireless communication circuit disposed in the housing; a processor disposed in the housing; and an FPCB disposed in the housing, including at least one first conductive line electrically connected between the wireless communication circuit and the at least one conductive portion, further including at least one second conductive line electrically connected between the processor and the electronic component, and extending so as not to overlap the electronic component when viewed from above the second plate.

In accordance with another aspect of the present disclosure, an electronic device includes a housing including a first plate, a second plate facing away from the first plate, and a lateral member surrounding a space between the first and second plates; a display disposed in the housing and exposed through at least a part of the first plate; a first substrate disposed in the housing; an application processor formed on the first substrate and generating data to be transmitted to outside of the electronic device; a first wireless communication circuit formed on the first substrate and generating an analog signal corresponding to the data and belonging to a first frequency band; a sound electronic component disposed in the housing; an antenna structure formed adjacent to the lateral member, the antenna structure including a second substrate having a first surface facing an inside of the electronic device and a second surface opposite to the first surface and facing the lateral member, a second wireless communication circuit formed on the first surface and generating a carrier wave corresponding to the analog signal and belonging to a second frequency band between 3 GHz and 100 GHz, and at least one antenna array formed on the second surface and emitting the carrier wave to the outside of the electronic device; and a third substrate including a first conductive area connecting the application processor and the sound electronic component, and a second conductive area connecting the first wireless communication circuit and the antenna structure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The present disclosure provides an electronic device including a structure that shares a connecting member such as an FPCB for electrically connecting various electronic components (e.g., a speaker, a sensor, a camera, an antenna, or a communication module). This structure can increase a mounting space (i.e., an internal space for mounting components) inside the electronic device.

Figure 1:
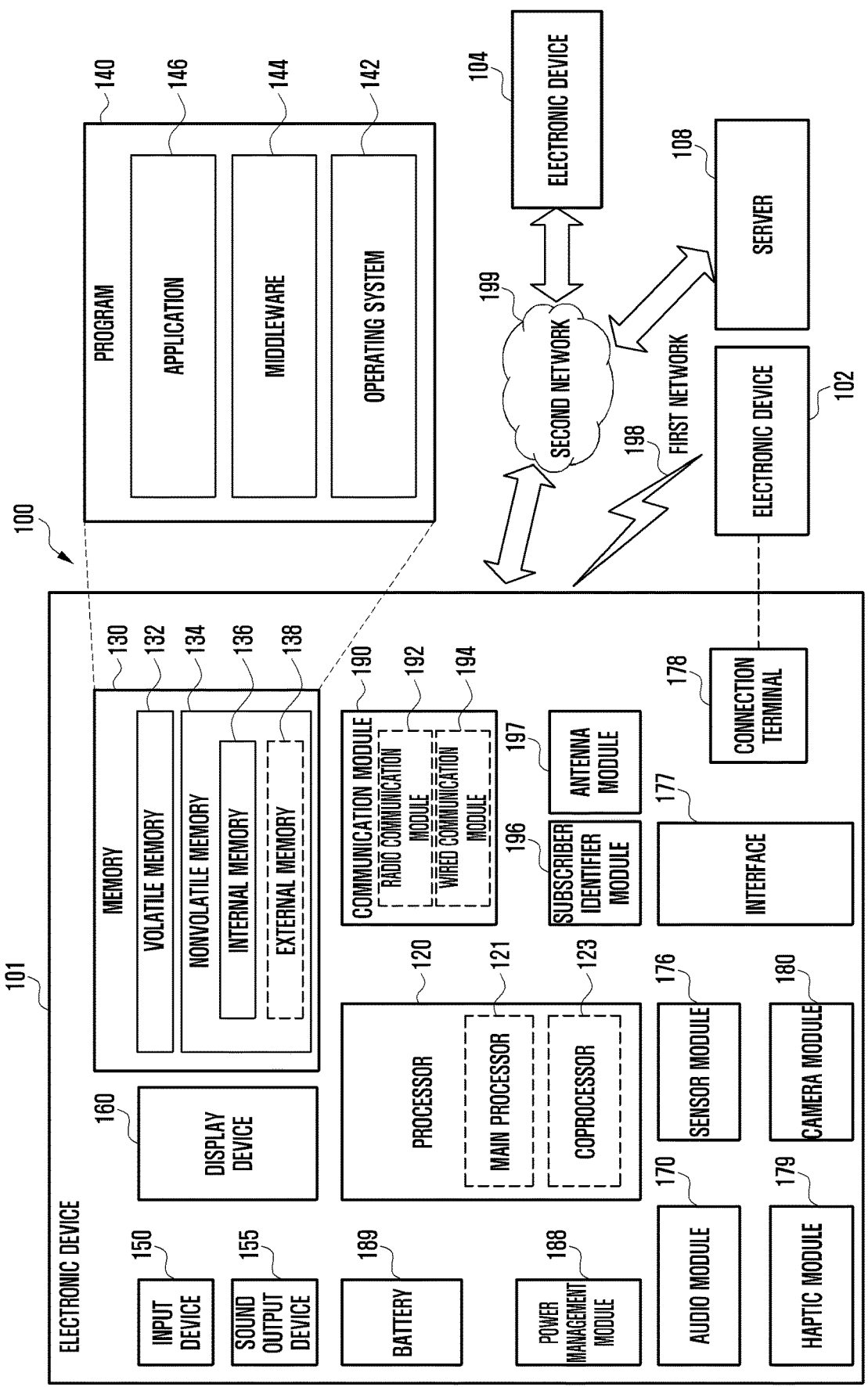
FIG. 1 is a block diagram illustrating an electronic device in a network environment, according to an embodiment.

FIG. 1 is a block diagram illustrating an electronic device 101 in a network environment 100, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
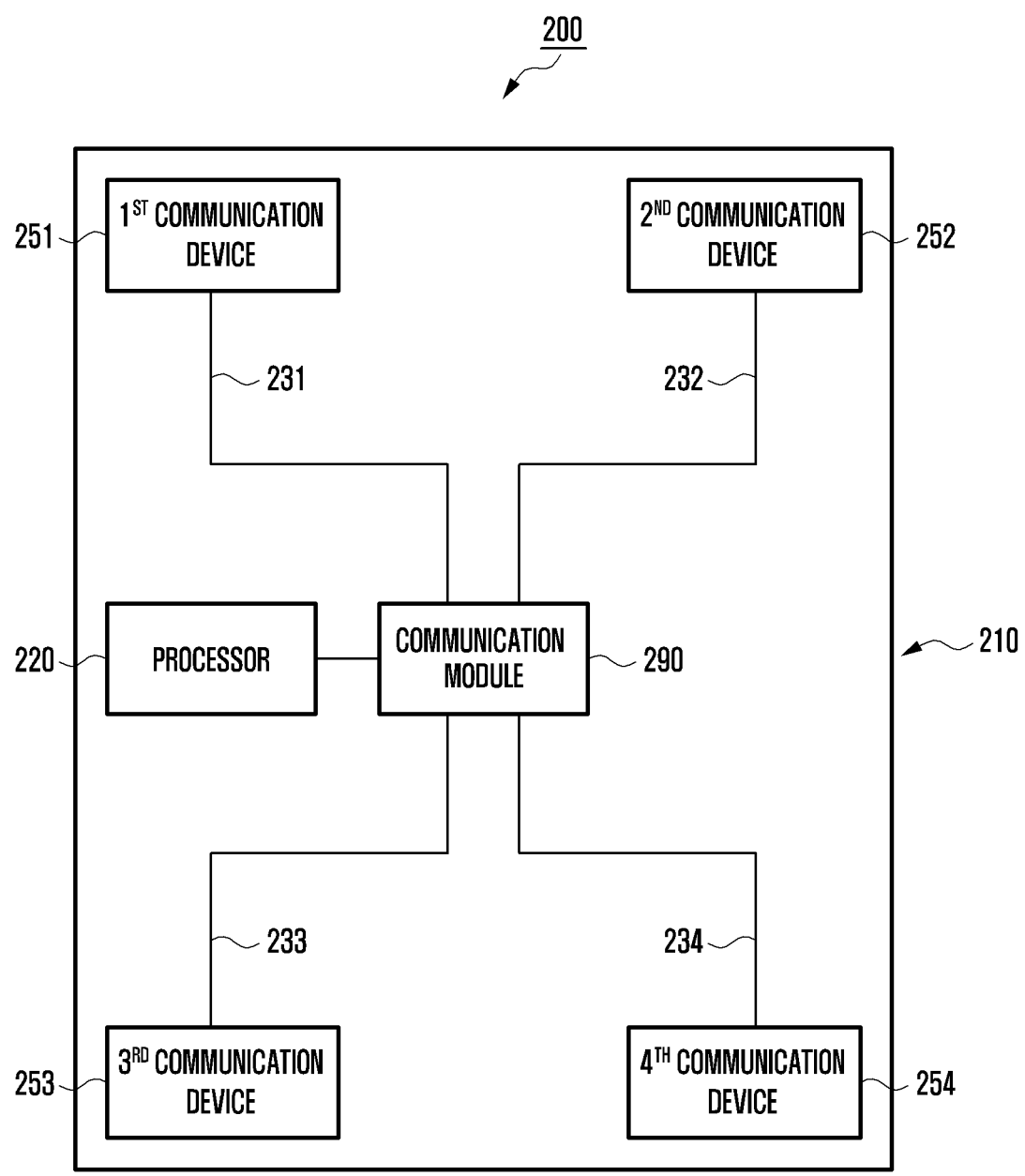
FIG. 2 is a block diagram illustrating an example of an electronic device supporting fifth generation (5G) communication, according to an embodiment.

FIG. 2 is a block diagram illustrating an example of an electronic device 200 supporting 5G communication, according to an embodiment.

Referring to FIG. 2, the electronic device 200 includes a housing 210, a processor 220, a communication module 290, a first communication device 251, a second communication device 252, a third communication device 253, a fourth communication device 254, a first conductive line 231, a second conductive line 232, a third conductive line 233, and a fourth conductive line 234. The electronic device 200 may further include a ground member within the housing 210.

The housing 210 may protect other components of the electronic device 200. The housing 210 may include, for example, a front plate (or a first plate), a back plate (or a second plate) facing away from the front plate, and a lateral member (or a metal frame) that is attached to or integrated with the back plate and surrounds a space between the front and back plates. According to an embodiment, the lateral member may include a lateral bezel structure 410 shown in FIG. 4. The lateral member may include at least one conductive portion.

The electronic device 200 may include at least one of the first communication device 251, the second communication device 252, the third communication device 253, or the fourth communication device 254. The first to fourth communication devices 251 to 254 may include first to fourth wireless communication circuits, respectively.

The first communication device 251, the second communication device 252, the third communication device 253, or the fourth communication device 254 may be located inside the housing 210. When viewed from above the back plate of the electronic device 200, the first communication device 251 may be disposed at an upper left portion of the electronic device 200, and the second communication device 252 may be disposed at an upper right portion of the electronic device 200. In addition, the third communication device 253 may be disposed at a lower left portion of the electronic device 200, and the fourth communication device 254 may be disposed at a lower right portion of the electronic device 200. Each of the first to fourth communication devices 251 to 254 may be configured to transmit and/or receive a signal having a frequency between 3 GHz and 100 GHz by using the communication module 290 (also referred to as an antenna module).

The processor 220 may include at least one of a CPU, an AP, a GPU, an ISP, or a baseband processor (also referred to as a CP). The processor 220 may be implemented, for example, in the form of a system on chip (SoC) or a system in package (SiP).

The communication module 290 may be electrically connected to the first communication device 251, the second communication device 252, the third communication device 253, or the fourth communication device 254 through the first conductive line 231, the second conductive line 232, the third conductive line 233, or the fourth conductive line 234. The communication module 290 may include, for example, a baseband processor or at least one communication circuit (e.g., an intermediate frequency integrated circuit (IFIC) or an RFIC). The baseband processor included in the communication module 290 may be different from the processor 220. The first conductive line 231, the second conductive line 232, the third conductive line 233, or the fourth conductive line 234 may be implemented, for example, in the form of a coaxial cable or an FPCB.

The communication module 290 may include a first baseband processor (first BP) or a second baseband processor (second BP). The electronic device 200 may further include one or more interfaces for supporting chip-to-chip communication between the processor 220 and the first BP (or the second BP). Using such a chip-to-chip interface (also referred to as an inter-processor communication channel), the processor 220 and the first BP (or the second BP) may transmit and receive data.

The first BP or the second BP may provide an interface for communicating with other entities. For example, the first BP may support wireless communication for the first network 198 shown in FIG. 1. Additionally or alternatively, the second BP may support wireless communication for the second network 199 shown in FIG. 1.

The first BP or the second BP may form a single module together with the processor 220. For example, the first BP or the second BP may be integrally formed with the processor 220. Additionally or alternatively, the first BP or the second BP may be disposed in one chip or implemented in the form of an independent chip. The processor 220 and at least one BP (e.g., the first BP) may be integrally formed in one chip (i.e., SoC chip), and the other BP (e.g., the second BP) may be formed in another independent chip.

The first network 198 and the second network 199 shown in FIG. 1 may be the $4^{th}$ generation (4G) network and the 5G network, respectively. The 4G network may support, for example, the long term evolution (LTE) protocol defined in the $3^{rd}$ Generation Partnership Project (3GPP). The 5G network may support, for example, the new radio (NR) protocol defined in 3GPP.

Figure 3:
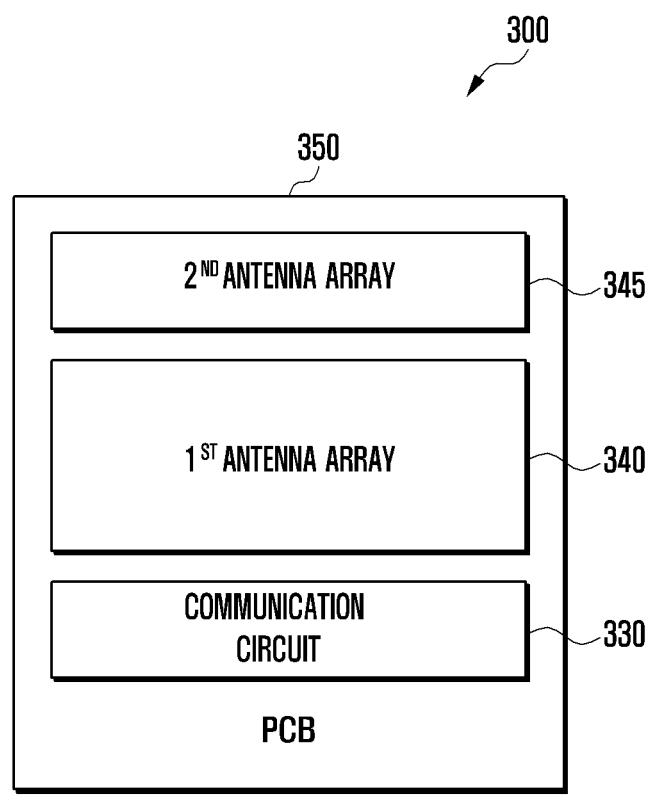
FIG. 3 is a block diagram illustrating a communication device, according to an embodiment.

FIG. 3 is a block diagram illustrating a communication device 300, according to an embodiment.

Referring to FIG. 3, the communication device 300 includes a communication circuit 330 (e.g., an RFIC), a PCB 350, a first antenna array 340, and/or a second antenna array 345. The first antenna array 340 and/or the second antenna array 345 may include the antenna module 197 shown in FIG. 1.

The communications circuit 330, the first antenna array 340, and/or the second antenna array 345 may be disposed on or in the PCB 350. For example, the first antenna array 340 and/or the second antenna array 345 may be disposed on a first surface of the PCB 350, and the communication circuit 330 may be disposed on a second surface of the PCB 350. The PCB 350 may include a connector (e.g., a coaxial cable connector or a board-to-board (B-to-B) connector) to be electrically connected to another PCB (e.g., a PCB on which the communication module 290 of FIG. 2 is disposed) through a transmission line (e.g., the first conductive line 231 such as a coaxial cable in FIG. 2). For example, using the coaxial cable connector, the PCB 350 may be connected to another PCB used for the communication module 290 via the coaxial cable. The coaxial cable may be used for delivering incoming/outgoing intermediate frequency (IF) signals or radio frequency (RF) signals. Additionally, power or control signals may be delivered through the B-to-B connector.

Each of the first antenna array 340 and the second antenna array 345 may include a plurality of antenna elements, each of which may be a patch antenna, a loop antenna, or a dipole antenna. For example, the antenna element included in the first antenna array 340 may be a patch antenna to form a beam toward the back plate of the electronic device 101 or 200 shown in FIG. 1 or 2. Additionally or alternatively, the antenna element included in the second antenna array 345 may be a dipole antenna or a loop antenna to form a beam toward the lateral member of the electronic device 101 or 200 shown in FIG. 1 or 2.

The communication circuit 330 may support at least some bands from about the 3 GHz band to about the 100 GHz band (e.g., from about 24 GHz to about 30 GHz or from about 37 GHz to about 40 GHz). The communications circuit 330 may perform up-conversion or down-conversion of frequencies. For example, the communication circuit 330 included in the communication device 300 (e.g., the first communication device 251 in FIG. 2) may up-convert an IF signal, received from a communication module 290 via a conductive line 231, into an RF signal. Additionally or alternatively, the communication circuit 330 included in the communication device 300 may down-convert an RF signal (e.g., a millimeter wave signal), received via the first antenna array 340 or the second antenna array 345, into an IF signal and then transmit the IF signal to a communication module 290 via a conductive line 231.

Figure 4:
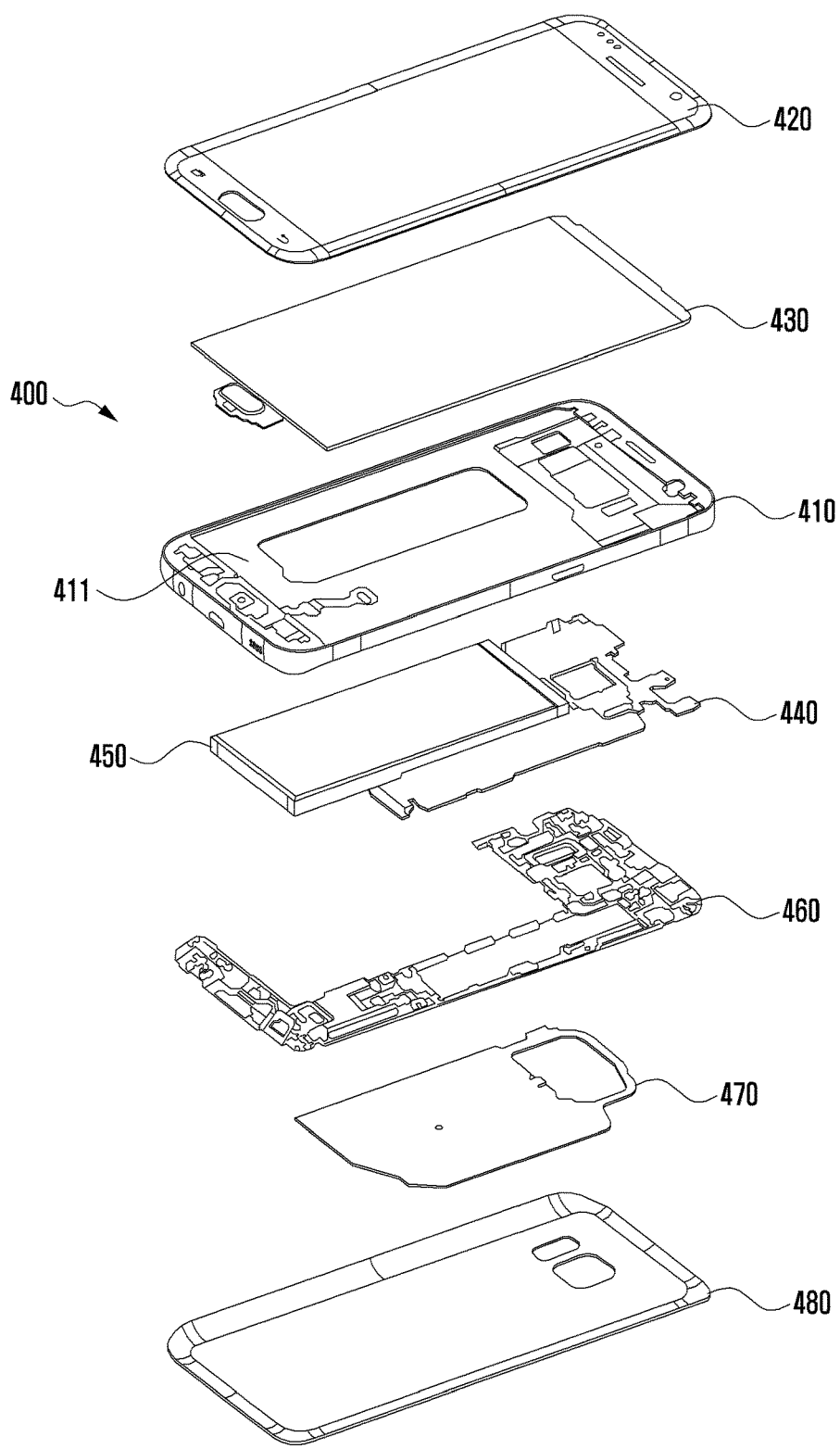
FIG. 4 is an exploded perspective view showing an electronic device, according to an embodiment.

FIG. 4 is an exploded perspective view showing an electronic device 400, according to an embodiment.

Referring to FIG. 4, the electronic device 400 includes a lateral bezel structure 410, a first support member 411 (e.g., a bracket), a front plate 420 (or a first plate), a display 430, a PCB 440 (or a first substrate), a battery 450, a second support member 460 (e.g., a rear case), an antenna 470, and a back plate 480 (or a second plate). The electronic device 400 may omit at least one (e.g., the first support member 411 or the second support member 460) of the above components or further include any other component. At least one of the above components of the electronic device 400 may be the same as or similar to at least one corresponding component of the electronic device 101 or 200 in FIG. 1 or 2, so that repeated descriptions will be omitted below. According to an embodiment, the lateral bezel structure 410 may form a lateral surface of the electronic device 400. The lateral bezel structure 410 may include at least one conductive portion. The front plate 420 and the back plate 480 may be spaced apart.

The first support member 411 may be disposed inside the electronic device 400 and connected to or integrally formed with the lateral bezel structure 410. The first support member 411 may be formed of, for example, a metal material and/or a nonmetal material (e.g., polymer). The first support member 411 may be combined with the display 430 at one side thereof and combined with the PCB 440 at the other side thereof. On the PCB 440, a processor 120 or 220, a memory 130, and/or an interface 177. The display 430 is disposed in a housing 210 and may be exposed through at least a part of the front plate 420 (or the first plate).

The processor may include, for example, one or more of a CPU, an AP, a GPU, an ISP, a CP, or a sensor hub processor. The memory may include, for example, volatile memory 132 and/or nonvolatile memory 134. The AP may be formed on the PCB 440 (or the first substrate) and generate data to be transmitted to the outside of the electronic device 400. The PCB 440 may include a first wireless communication circuit 330 for generating an analog signal corresponding to the data and belonging to a first frequency band.

The interface may include, for example, an HDMI, a USB interface, an SD card interface, and/or an audio interface. The interface may electrically or physically connect the electronic device 400 to an external electronic device 102 or 104 and may include a USB connector, an SD card/MMC connector, or an audio connector.

The battery 450 is a device for supplying power to at least one component of the electronic device 400 and may include, for example, a non-rechargeable primary battery, a rechargeable secondary battery, or a fuel cell. At least a portion of the battery 450 may be disposed on the substantially same plane as that of the PCB 440. The battery 450 may be integrally or detachably disposed in the electronic device 400.

The antenna 470 may be disposed between the back plate 480 and the battery 450. The antenna 470 may include, for example, a near field communication (NFC) antenna, a wireless charging antenna, and/or a magnetic secure transmission (MST) antenna. The antenna 470 may perform short range communication with an external electronic device 102 or wirelessly transmit and receive power required for charging. The antenna structure may be formed by the lateral bezel structure 410 and/or a portion of the first support member 411 or a combination thereof.

The antenna 470 may be disposed at a first area adjacent to the lateral bezel structure 410 (e.g., the lateral member) in the housing 210. At a second area adjacent to the first area in the housing, at least one electronic component (e.g., a speaker, an IR sensor, a camera, a receiver, a proximity sensor, and/or an LED sensor) may be disposed. This electronic component may be disposed adjacent to the conductive portion of the lateral bezel structure 410.

The electronic device may be one of various types of electronic devices. The electronic devices may include, for example, a portable communication device (e.g., a smart phone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 5:
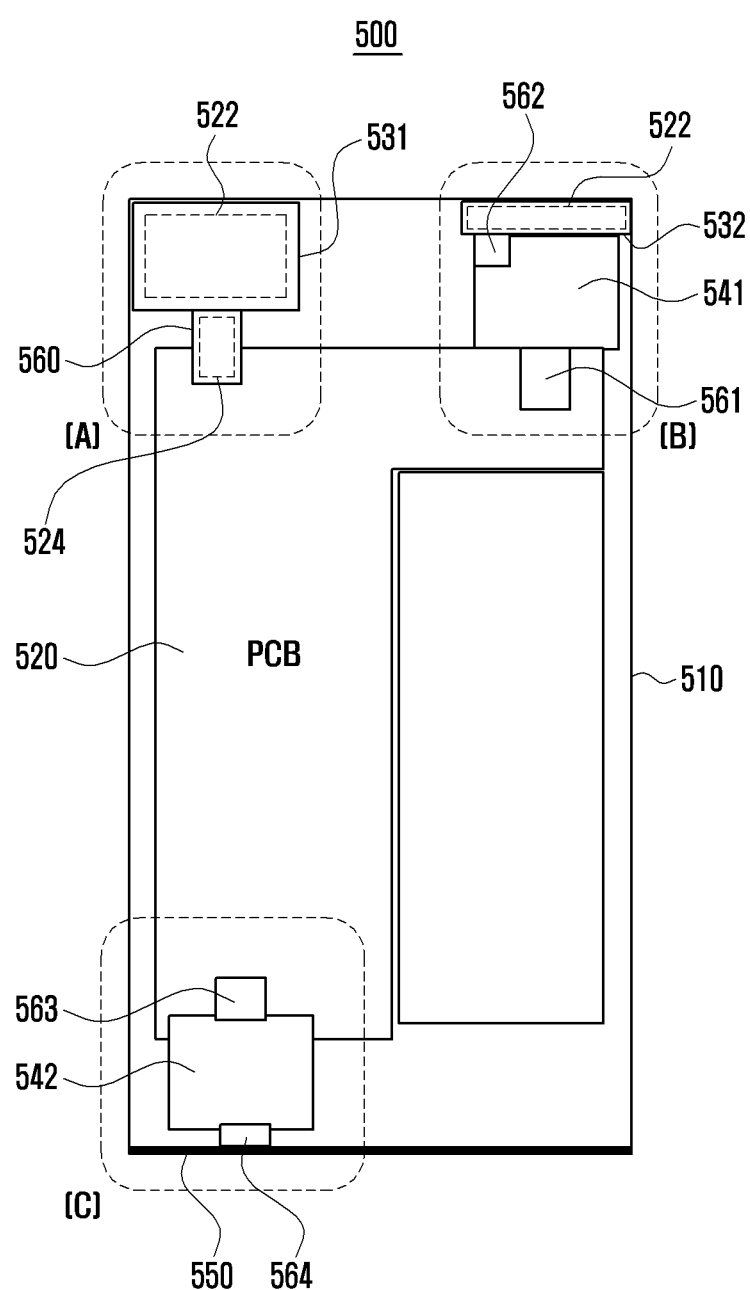
FIG. 5 is a schematic diagram illustrating an electronic device including a connecting member and/or a connector, according to an embodiment.

FIG. 5 is a schematic diagram illustrating an electronic device 500 including a connecting member and/or a connector, according to an embodiment.

Referring to FIG. 5, the electronic device 500 includes a housing 510, a PCB 520, first and second communication devices 531 and 532, first and second electronic components 541 and 542, an antenna 550, and/or a connecting member 560 (e.g., an FPCB).

The housing 510 may accommodate the PCB 520, the first and second communication devices 531 and 532, the first and second electronic components 541 and 542, the antenna 550, and/or the connecting member 560, which are internal components of the electronic device 500. The housing 510 may include a lateral bezel structure 410.

At least a portion of externally exposed surfaces of the housing 510 may be formed of a conductive material (e.g., metal) and used as the antenna 550 or a communication module of the electronic device 500.

Each of the first and second communication devices 531 and 532 may be formed near the lateral bezel structure 410 (or the lateral member) in FIG. 4. Each of the first and second communication devices 531 and 532 may include a second substrate 522. The second substrate 522 may include a first surface facing the inside of the electronic device 500 and a second surface opposite to the first surface and facing the lateral bezel structure 410.

The PCB 520 (or the first substrate) may be disposed in at least a portion of the housing 510 and may include a processor 120 or 220, a memory 130, a power management module 188, and/or an interface 177.

Each of the first and second communication devices 531 and 532 may transmit or receive a signal to or from an external electronic device 102 or 104 through an antenna suitable for a corresponding communication scheme. Each of the first and second communication devices 531 and 532 may include a BP or at least one communication circuit 330 on the second substrate 522. For example, each of the first and second communication devices 531 and 532 may include at least one module for 5G communication such as an RFIC. Each of the first and second communication devices 531 and 532 may include at least one of the communication module 190 in FIG. 1, the communication module 290 in FIG. 2, and the communication device 300 in FIG. 3.

The first and second electronic components 541 and 542 may include at least one of the sound output device 155 (e.g., a speaker or a receiver), the sensor module 176, the camera module 180, which are shown in FIG. 1, and an LED sensor.

The antenna 550 may include at least one antenna for transmitting or receiving a signal or power to or from the outside. The antenna 550 may include, for example, an NFC antenna, a wireless charging antenna, an MST antenna, and/or a 5G antenna.

The connecting member 560 may include an electrical connection member of an FPCB type or a bar type for shielding an RF signal. The connecting member 560 may include the connection terminal 178 in FIG. 1 or the first to fourth conductive lines 231 to 234 in FIG. 2. The connecting member 560 may include a third substrate 524.

As indicated by "[A]" in FIG. 5, the PCB 520 and the first communication device 531 may be electrically connected to each other through the connecting member 560. For example, a first terminal of the connecting member 560 may be connected to the PCB 520, and a second terminal of the connecting member 560 may be connected to the first communication device 531.

As indicated by "[B]" in FIG. 5, the PCB 520 and the second communication device 532 may be electrically connected to each other through a first connector 561, a second connector 562, and the first electronic component 541. For example, the first connector 561 may connect the PCB 520 and the first electronic component 541. The second connector 562 may connect the first electronic component 541 and the second communication device 532. The second connector 562 may include the connecting member 560 (e.g., the FPCB) as described above.

As indicated by "[C]" in FIG. 5, the PCB 520, the antenna 550, and the second electronic component 542 may be electrically connected through a third connector 563 and a fourth connector 564. For example, the third connector 563 may connect the PCB 520 and the second electronic component 542. The fourth connector 564 may connect the second electronic component 542 and the antenna 550.

Figure 6:
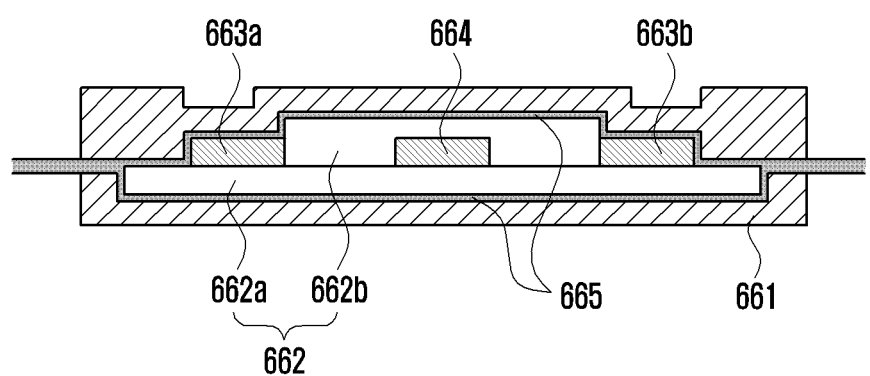
FIG. 6 is a cross-sectional view showing an example of a connecting member (e.g., an FPCB) of an electronic device, according to an embodiment.

FIG. 6 is a cross-sectional view showing an example of a connecting member 560 (e.g., an FPCB) of an electronic device, according to an embodiment.

Referring to FIG. 6, the connecting member 560 includes a shielding member 661, an insulator 662, a first ground 663a, a second ground 663b, a communication signal line 664, and a conductive adhesive layer 665.

At least a part of the shielding member 661 may be coated with the conductive adhesive layer 665. The conductive adhesive layer 665 may surround the insulator 662, the first ground 663a, and the second ground 663b. The conductive adhesive layer 665 may be electrically connected to the first ground 663a and the second ground 663b. The shielding member 661 may be formed of, for example, a shield film and organize a framework of the connecting member 560. The shielding member 661 may be formed of a deformable rubber material. The conductive adhesive layer 665 may shield the communication signal line 664 and also prevent crosstalk between a signal received on the communication signal line 664 and a signal transmitted to the outside.

The insulator 662 may include a first insulator 662a and a second insulator 662b. The insulator 662 may be formed of an insulating material.

The first ground 663a and the second ground 663b may be spaced apart from each other on the first insulator 662a. In addition, the first ground 663a and the second ground 663b may be disposed on both sides of the second insulator 662b.

The communication signal line 664 may be disposed at a predetermined position (e.g., the center) of the second insulator 662b on the first insulator 662a. The communication signal line 664 may be a conductive line capable of transmitting/receiving a communication signal. The communication signal line 664 may include, for example, at least one of the first conductive line 231 to the fourth conductive line 234 in FIG. 2.

Figure 7:
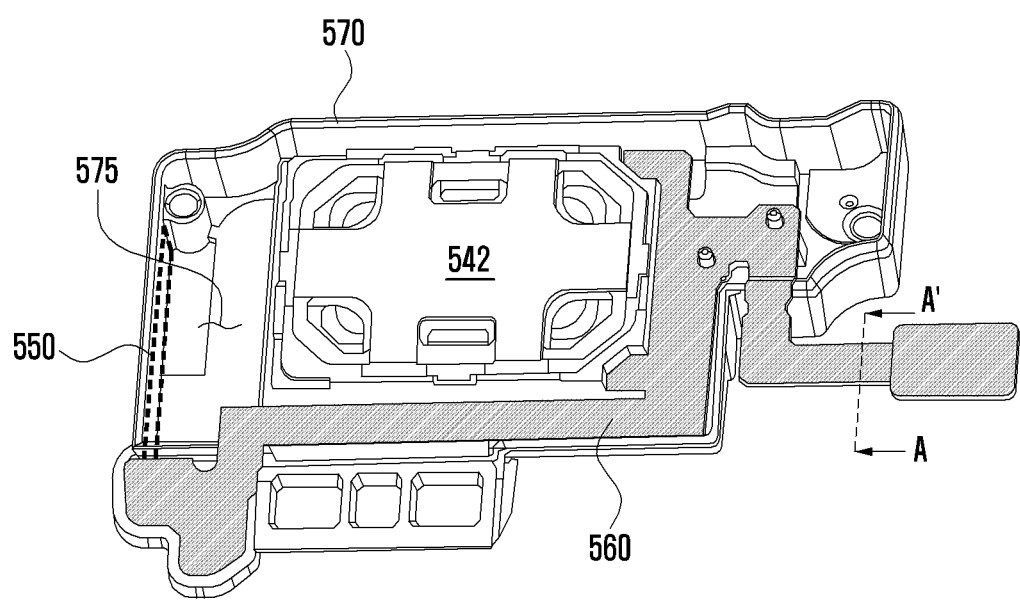
FIG. 7 is a perspective view showing an example in which an electronic component (e.g., a speaker or a receiver) and a connecting member are integrally formed, according to an embodiment.

FIG. 7 is a perspective view showing an example in which an electronic component (e.g., a speaker or a receiver) and a connecting member 560 (e.g., an FPCB) are integrally formed, according to an embodiment.

Referring to FIG. 7, an electronic device 500 includes the antenna 550, the second electronic component 542, and the connecting member 560.

The second electronic component 542 and the connecting member 560 may be integrally formed. The second electronic component 542 and the connecting member 560 may be disposed on the substantially same plane. The second electronic component 542 may include, for example, a speaker (e.g., the sound output device 155 in FIG. 1) or a receiver.

The antenna 550 and the second electronic component 542 may be electrically connected to each other through the connecting member 560. The second electronic component 542 may receive at least one signal, transmitted to the antenna 550, from a PCB 520 via the connecting member 560. The connecting member 560 may extend so as not to overlap the second electronic component 542 and then be connected to the antenna 550. The antenna 550 may be mounted on the outermost portion of the electronic device 500 and electrically connected to the connecting member 560.

An enclosure 570 may surround the second electronic component 542 and at least a portion of the connecting member 560. A back volume space 575 may be formed between the enclosure 570 and the second electronic component 542.

Figure 8:
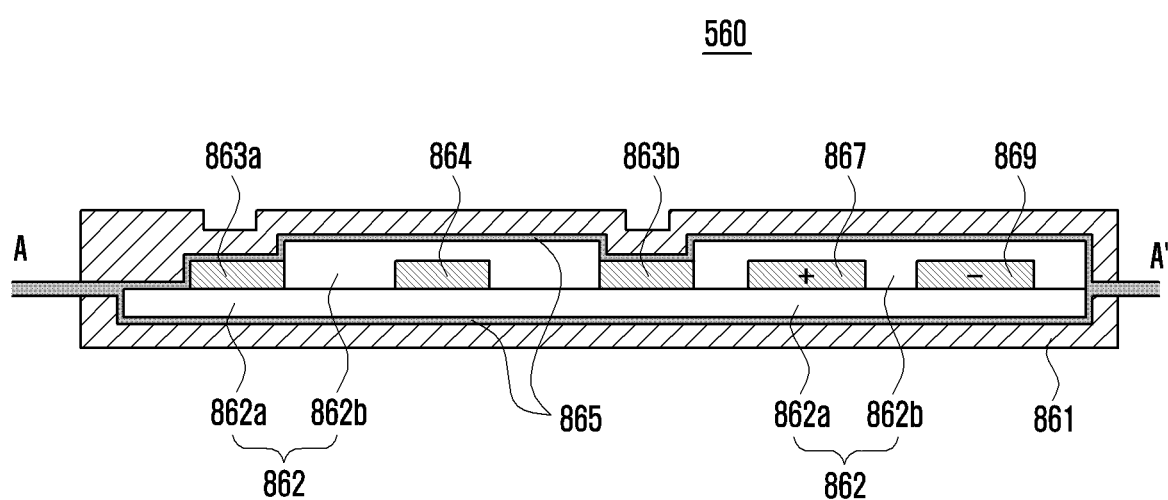
FIG. 8 is a cross-sectional view taken along line A-A' in FIG. 7, showing another example of a connecting member (e.g., an FPCB) of an electronic device, according to an embodiment.

FIG. 8 is a cross-sectional view taken along the line A-A' in FIG. 7, showing an example of a connecting member 560 (e.g., an FPCB) of an electronic device, according to an embodiment.

Referring to FIG. 8, the connecting member 560 includes a shielding member 861, an insulator 862, a first ground 863a, a second ground 863b, a communication signal line 864, a conductive adhesive layer 865, a first conductive line 867, and a second conductive line 869.

At least a part of the shielding member 861 may be coated with the conductive adhesive layer 865, which may surround the insulator 862, the first ground 863a, and the second ground 863b. The conductive adhesive layer 865 may be electrically connected to the first ground 863a and the second ground 863b. The shielding member 861 may be formed of, for example, a shield film and organize a framework of the connecting member 560. The shielding member 861 may be formed of a deformable rubber material. The conductive adhesive layer 865 may shield the communication signal line 864 and also prevent crosstalk between a signal received on the communication signal line 864 and a signal transmitted to the outside.

The insulator 862 may include a first insulator 862a and a second insulator 862b. The insulator 862 may be formed of an insulating material.

The first ground 863a and the second ground 863b may be spaced apart from each other on the first insulator 862a. The first ground 863a and the second ground 863b may be connected to a ground member included in the PCB 520 of FIG. 5. The first ground 863a and the second ground 863b may be disposed on both sides of the second insulator 862b.

The communication signal line 864 may be disposed at a predetermined position (e.g., the center) of the second insulator 862b on the first insulator 862a. The communication signal line 864 may be a third conductive line capable of transmitting/receiving a communication signal. The communication signal line 864 may include, for example, at least one of the first conductive line 231 to the fourth conductive line 234 in FIG. 2. The communication signal line 864 (e.g., the third conductive line) may be electrically connected to the communication module 290 included in the housing 210 shown in FIG. 2. The communication signal line 864 may be implemented as at least one or more lines.

The first conductive line 867 and the second conductive line 869 may transmit at least one signal to be delivered to an antenna 550 via a PCB 520. In addition, the first conductive line 567 and the second conductive line 569 may deliver at least one signal to the PCB 520 received via the antenna 550.

The first conductive line 867 of the connecting member 560 may electrically connect the first communication device 231 (e.g., the first wireless communication circuit) and the communication module 290 (e.g., the antenna module) both of which are shown in FIG. 2. The second conductive line 869 of the connecting member 560 may electrically connect the processor 220 shown in FIG. 2 and the second electronic component 542 shown in FIG. 7. The first conductive line 867 of the connecting member 560 may electrically connect the first communication device 231 (e.g., the first wireless communication circuit) shown in FIG. 2 and at least one conductive portion included in the lateral bezel structure 410 shown in FIG. 4.

Figure 9:
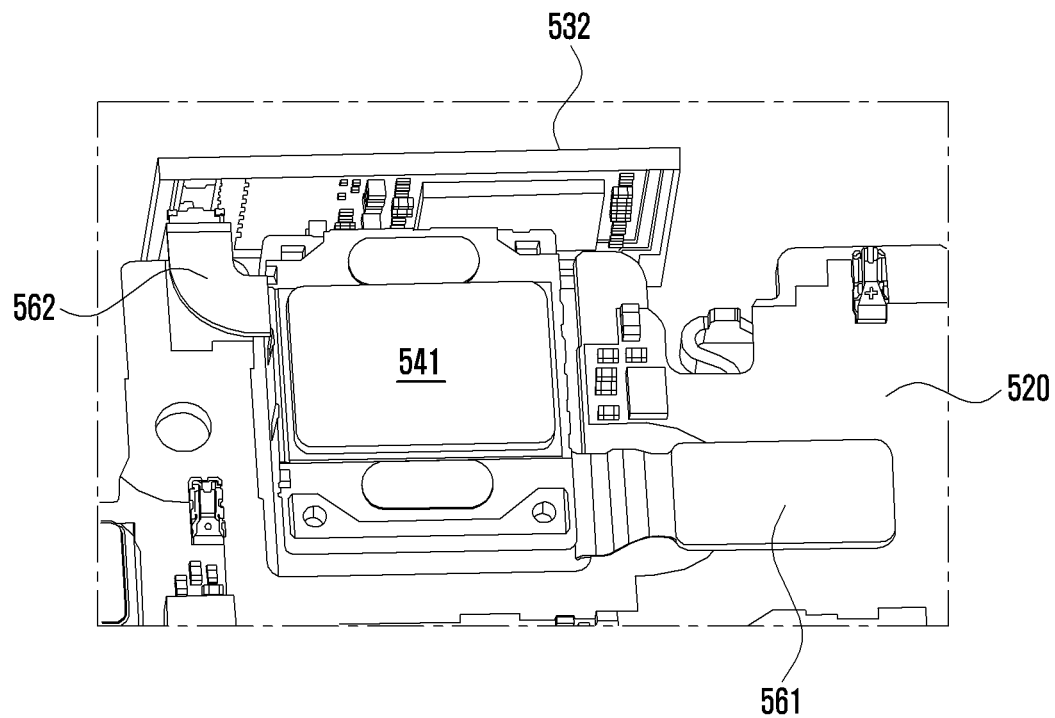
FIG. 9 is a perspective view showing an example of an electronic component (e.g., a speaker or a receiver) and first and second connectors, according to an embodiment.

FIG. 9 is a perspective view showing an example of an electronic component (e.g., a speaker or a receiver) and first and second connectors 561 and 562, according to an embodiment.

Referring to FIG. 9, an electronic device (e.g., the electronic device 500 in FIG. 5) includes the PCB 520, the second communication device 532, the first electronic component 541, the first connector 561, and the second connector 562. The first electronic component 541 may include, for example, a speaker (e.g., the sound output device 155 in FIG. 1) or a receiver.

The PCB 520, the second communication device 532, and the first electronic component 541 may be electrically connected through the first connector 561 and the second connector 562. For example, the first connector 561 may connect the PCB 520 and the first electronic component 541. The second connector 562 may connect the first electronic component 541 and the second communication device 532. The first connector 561, the first electronic component 541, and the second connector 562 may be disposed on the substantially same plane.

The second connector 562 may include the connecting member 560 (e.g., an FPCB) shown in FIGS. 6 and 8. The second connector 562 may form various types of connection structures. For example, a conductive contact component may be mounted on the second connector 562. The conductive contact component mounted on the second connector 562 may be electrically connected to the second communication device 532. A connector (e.g., an adapter) for connection with other electronic components may be further mounted on the second connector 562. The connector further mounted on the second connector 562 may be connected to a connector mounted on the second communication device 532. The first electronic component 541 may transmit at least one of a communication signal, power, and a control signal to the second communication device 532 through the second connector 562. The second communication device 532 may have a structure attached to or supported by a portion of the first electronic component 540. The second communication device 532 may include at least one of a patch antenna or a dipole antenna.

Figure 10:
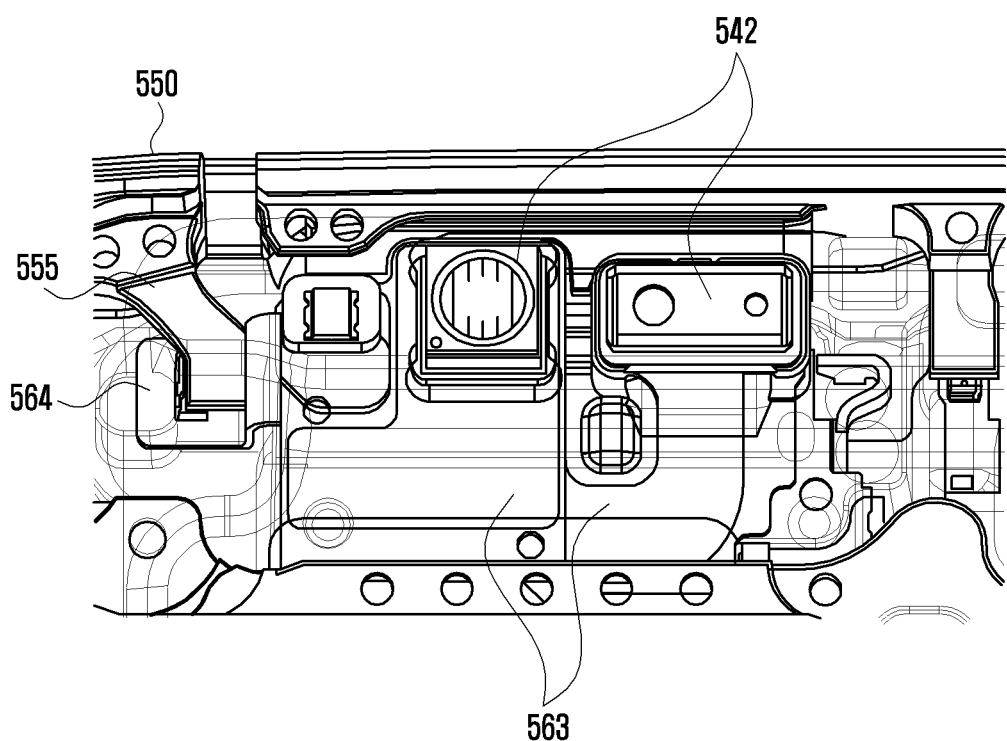
FIGS. 10 and 11 are perspective views showing an example of an electronic component (e.g., a sensor) and third and fourth connectors, according to various embodiments.
Figure 11:
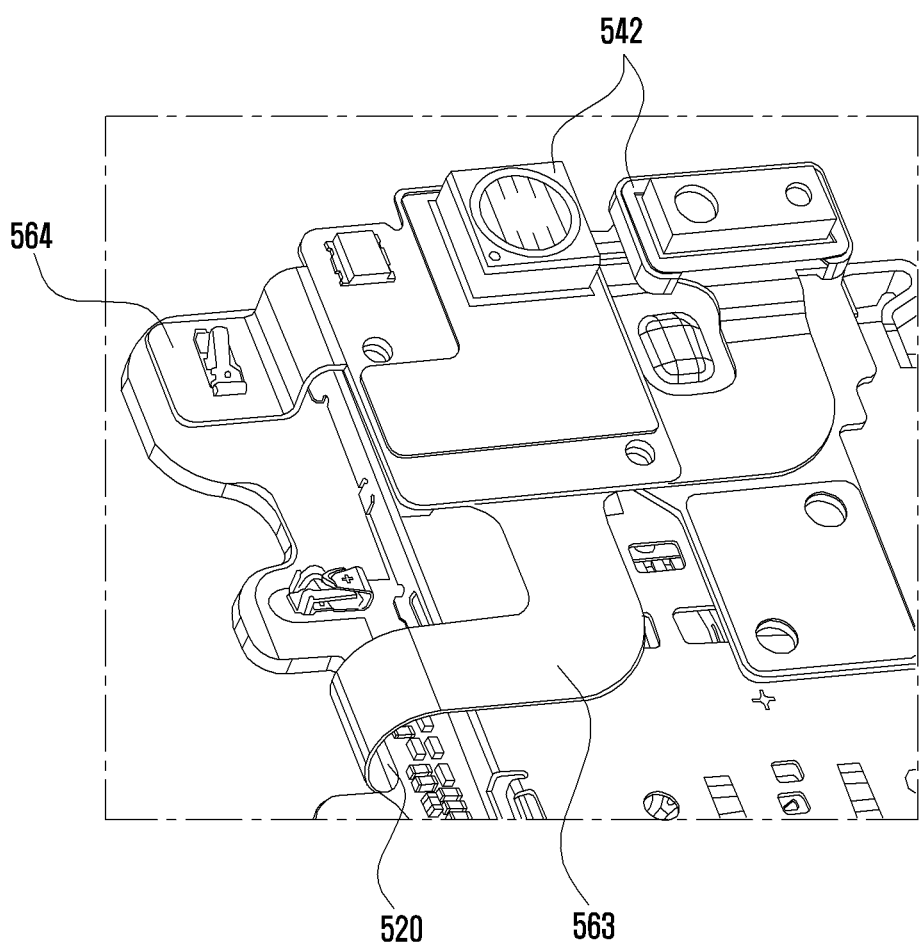

FIGS. 10 and 11 are perspective views showing an example of an electronic component (e.g., a sensor) and third and fourth connectors 563 and 564, according to various embodiments.

Referring to FIG. 10, an electronic device 500 includes the antenna 550, the second electronic component 542, the third connector 563, and the fourth connector 564. The second electronic component 542 may include, for example, a sensor (e.g., the sensor module 176 in FIG. 1). The fourth connector 564 may be replaced by the connecting member 560 (e.g., an FPCB) shown in FIGS. 6 and 8. The antenna 550 may be connected to the fourth connector 564 through a contact portion 555. A conductive contact component may be mounted on the fourth connector 564. The conductive contact component mounted on the fourth connector 564 may be electrically connected to the antenna 550. A connector (e.g., an adapter) for connection with other electronic components may be further mounted on the fourth connector 564. The connector further mounted on the fourth connector 564 may be connected to a connector mounted on the antenna 550.

The antenna 550 may be electrically connected to the PCB 520 through the fourth connector 564, the second electronic component 542, and the third connector 563. For example, the third connector 563 may connect the PCB 520 and the second electronic component 542. The fourth connector 564 may be connected to the second electronic component 542 and also connected to the antenna 550 through the contact portion 555.

The second electronic component 542 may receive at least one signal from the PCB 520 via the third connector 563 and then transmit the received signal to the antenna 550 via the fourth connector 564 and the contact portion 555. The third connector 563 or the fourth connector 564 may be formed to be substantially the same as the connecting member 560 shown in FIGS. 6 and 8.

Figure 12:
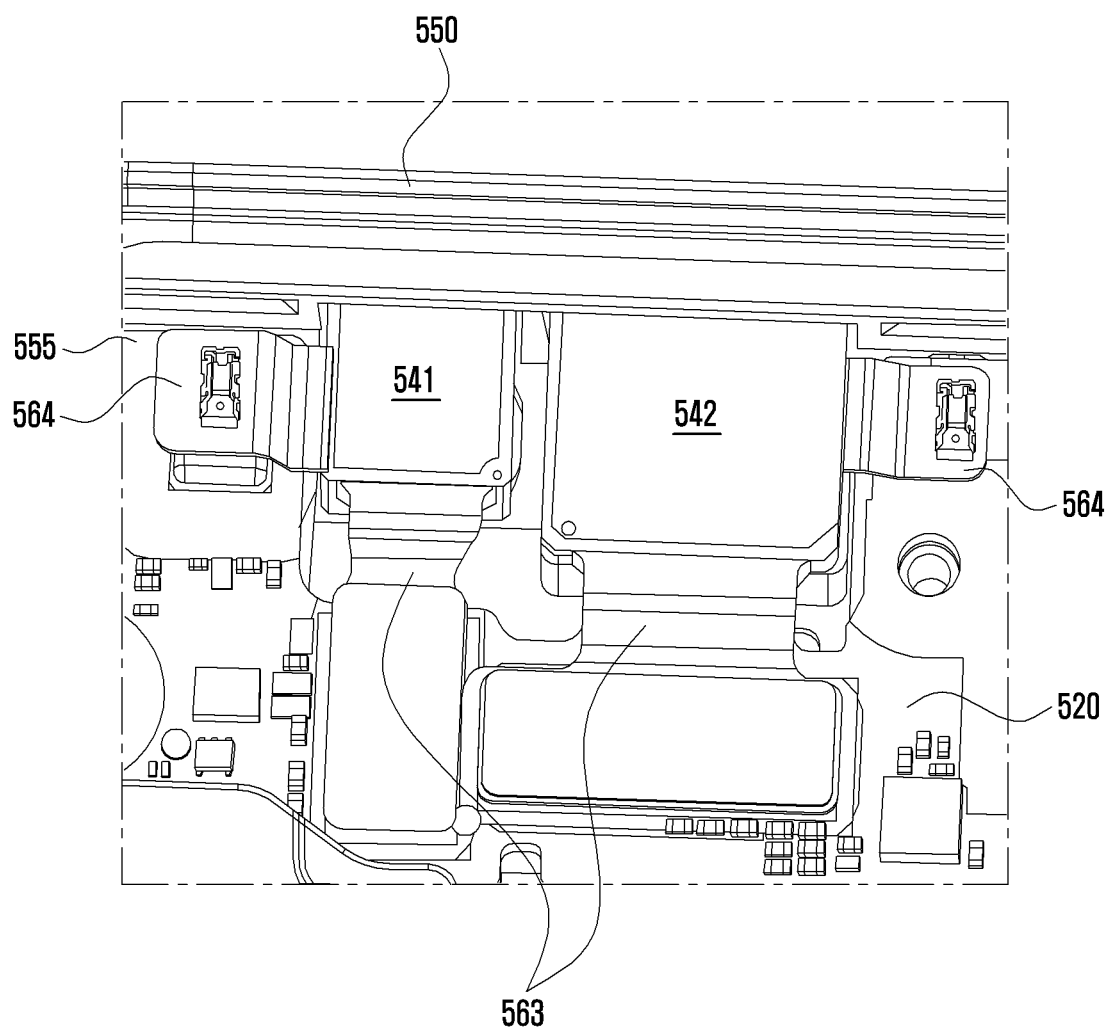
FIG. 12 is a perspective view showing an example of an electronic component (e.g., a camera) and third and fourth connectors, according to an embodiment.

FIG. 12 is a perspective view showing an example of an electronic component (e.g., a camera) and third and fourth connectors 563 and 564, according to an embodiment.

Referring to FIG. 12, an electronic device 500 includes the PCB 520, the antenna 550, the first electronic component 541, the second electronic component 542, the third connector 563, and the fourth connector 564. The first and second electronic components 541 and 542 may include, for example, a camera module 180. The first electronic component 541 may include an IR camera, and the second electronic component 542 may include a thermal imaging camera.

The fourth connector 564 may be replaced with the connecting member 560 (e.g., an FPCB) shown in FIGS. 6 and 8. The antenna 550 may be replaced with the antenna 550 shown in FIGS. 7 and 10. The fourth connector 564 may be integrated with the antenna 550. A conductive contact component may be mounted on the fourth connector 564. The conductive contact component mounted on the fourth connector 564 may be electrically connected to the antenna 550. A connector (e.g., an adapter) for connection with other electronic component(s) may be further mounted on the fourth connector 564. The connector further mounted on the fourth connector 564 may be connected to a connector mounted on the antenna 550. The antenna 550 may be connected to the fourth connector 564 through the contact portion 555. The antenna 550 may be replaced with the communication device 300 in FIG. 3 or the second communication device 532 in FIGS. 5 and 9.

The PCB 520 and the antenna 550 (or the communication device 300 in FIG. 3 or the second communication device 532 in FIGS. 5 and 9) may be electrically connected through the third and fourth connectors 563 and 564 and the first and second electronic components 541 and 542. For example, the third connector 563 may connect the PCB 520 and the first electronic component 541 and/or the second electronic component 542. The first electronic component 541 may include a first camera (e.g., the IR camera), and the second electronic component 542 may include a second camera (e.g., the thermal imaging camera). At least one third connector 563 may be provided to electrically connect the first electronic component 541 and the second electronic component 542. At least one fourth connector 564 may be provided to connect the first and second electronic components 541 and 542 and the antenna 550. The third and fourth connectors 563 and 564 and the first and second electronic components 541 and 542 may be disposed on the substantially same plane.

The antenna 550 may include the communication device 330 in FIG. 3 or the antenna 550 in FIG. 10. The first and second electronic components 541 and 542 may receive at least one signal from the PCB 520 through the third connector 563, and the received signal may be delivered to the antenna 550 through the fourth connector 564 and the contact portion 555. The third connector 563 or the fourth connector 564 may be formed to be substantially the same as the connecting member 560 shown in FIGS. 6 and 8.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a housing including a first plate, a second plate facing away from the first plate, and a lateral member surrounding a space between the first and second plates;
   a display disposed in the housing and exposed through at least a part of the first plate;
   an antenna module disposed at a first area adjacent to the lateral member and between the second plate and a battery;
   an electronic component disposed at a second area adjacent to the first area in the housing;
   at least one wireless communication circuit disposed in the housing and configured to transmit or receive a signal having a frequency between 3 gigahertz (GHz) and 100 GHz through the antenna module;
   a processor disposed in the housing; and
   a flexible printed circuit board (FPCB) including a first conductive line electrically connected between the at least one wireless communication circuit and the antenna module, and a second conductive line electrically connected between the processor and the electronic component.

2. The electronic device of claim 1, wherein when viewed from above the second plate, the FPCB extends so as not to overlap the electronic component and is connected to the antenna module.

3. The electronic device of claim 1, wherein the electronic component includes a speaker, an infrared (IR) sensor, a camera, a receiver, a proximity sensor, or a light emitting diode (LED) sensor.

4. The electronic device of claim 1, further comprising:
   a ground member in the housing,
   wherein the FPCB further includes a third conductive line extending between the first and second conductive lines and electrically connected to the ground member.

5. An electronic device comprising:
   a housing including a first plate, a second plate spaced apart and facing away from the first plate, and a lateral member surrounding a space between the first and second plates and including at least one conductive portion;
   a display disposed in the housing and exposed through at least a part of the first plate;
   an electronic component disposed in the housing and disposed adjacent to the at least one conductive portion;
   a wireless communication circuit disposed in the housing;
   a processor disposed in the housing; and
   a flexible printed circuit board (FPCB) disposed in the housing, including at least one first conductive line electrically connected between the wireless communication circuit and the at least one conductive portion, further including at least one second conductive line electrically connected between the processor and the electronic component, and extending so as not to overlap the electronic component when viewed from above the second plate,
   wherein a first side of the lateral member faces the display and a second side of the lateral member faces the FPCB.

6. The electronic device of claim 5, wherein the electronic component includes a speaker, an infrared (I R) sensor, a camera, a receiver, or a light emitting diode (LED) sensor.

7. The electronic device of claim 5, further comprising:
   a ground member in the housing,
   wherein the FPCB further includes a third conductive line extending between the first and second conductive lines and electrically connected to the ground member.

8. An electronic device comprising:
   a housing including a first plate, a second plate facing away from the first plate, and a lateral member surrounding a space between the first and second plates;
   a display disposed in the housing and exposed through at least a part of the first plate;
   a first substrate disposed in the housing;
   an application processor formed on the first substrate and generating data to be transmitted to outside of the electronic device;
   a first wireless communication circuit formed on the first substrate and generating a first analog signal corresponding to the data and belonging to a first frequency band;
   a sound electronic component disposed in the housing;
   an antenna structure formed adjacent to the lateral member and between the second plate and a battery, the antenna structure including a second substrate having a first surface facing an inside of the electronic device and a second surface opposite to the first surface and facing the lateral member, a second wireless communication circuit formed on the first surface and generating a carrier wave corresponding to the first analog signal and belonging to a second frequency band between 3 gigahertz (GHz) and 100 GI-z, and at least one antenna array formed on the second surface and emitting the carrier wave to the outside of the electronic device; and
   a third substrate including a first conductive area connecting the application processor and the sound electronic component, and a second conductive area connecting the first wireless communication circuit and the antenna structure.

9. The electronic device of claim 8, wherein the first wireless communication circuit includes a communication processor configured to generate a second analog signal belonging to the second frequency band corresponding to a baseband, based at least in part on the data.

10. The electronic device of claim 9, wherein the first wireless communication circuit further includes a third wireless communication circuit generating a third analog signal, as at least a part of the first analog signal, belonging to a third frequency band higher than the second frequency band and lower than the first frequency band, based at least in part on the second analog signal.

11. The electronic device of claim 8, wherein the sound electronic component includes a speaker.

12. The electronic device of claim 8, wherein a first surface of the sound electronic component is adjacent to the lateral member, and wherein a second surface adjacent to the first surface and a third surface opposite to the first surface are substantially surrounded by the third substrate.

13. The electronic device of claim 8, wherein when viewed from above the second plate, the sound electronic component is disposed so as not to overlap with the third substrate.

14. The electronic device of claim 8, wherein the third substrate includes a flexible printed circuit board (FPCB), and wherein at least one of the first conductive area or the second conductive area are formed on the FPCB.

15. The electronic device of claim 8, wherein the third substrate includes a shielding member, an insulator, a first ground, a second ground, a communication circuit, and a conductive adhesive layer,
- wherein at least a part of the shielding member is coated with the conductive adhesive layer,
- wherein the conductive adhesive layer surrounds the insulator, the first ground, and the second ground, and is electrically connected to the first ground and the second ground,
- wherein the insulator includes a first insulator and a second insulator,
- wherein the first ground and the second ground are spaced apart from each other on the first insulator and disposed on both sides of the second insulator, and
- wherein the communication circuit is disposed between the first ground and the second ground on the first insulator and surrounded by the second insulator.

\* \* \* \* \*